United States Patent
Zimmer et al.

(10) Patent No.: US 10,213,926 B2
(45) Date of Patent: Feb. 26, 2019

(54) GRIPPING DEVICE WITH LOCKING ARRANGEMENT

(71) Applicants: Martin Zimmer, Rheinau (DE); Guenther Zimmer, Rheinau (DE)

(72) Inventors: Martin Zimmer, Rheinau (DE); Guenther Zimmer, Rheinau (DE)

(*) Notice: Subject to any disclaimer, the term of this patent is extended or adjusted under 35 U.S.C. 154(b) by 0 days.

(21) Appl. No.: 15/842,918

(22) Filed: Dec. 15, 2017

(65) Prior Publication Data

US 2018/0117774 A1 May 3, 2018

Related U.S. Application Data

(63) Continuation-in-part of application No. PCT/DE2016/000250, filed on Jun. 14, 2016.

(51) Int. Cl.
| | |
|---|---|
| B25J 15/02 | (2006.01) |
| B25J 19/06 | (2006.01) |
| F16H 1/20 | (2006.01) |
| F16H 19/04 | (2006.01) |

(52) U.S. Cl.
CPC ......... *B25J 15/026* (2013.01); *B25J 15/0253* (2013.01); *B25J 19/06* (2013.01); *B25J 19/063* (2013.01); *F16H 1/203* (2013.01); *F16H 19/04* (2013.01); *Y10S 901/32* (2013.01); *Y10S 901/49* (2013.01)

(58) Field of Classification Search
CPC .. B25J 15/0253; B25J 15/026; B25J 15/0425; B25J 15/0458; B25J 15/0475; B25J 19/06; B25J 19/063; B25J 19/065; Y10S 901/32; Y10S 901/49

USPC ........................................................ 294/119.1
See application file for complete search history.

(56) References Cited

U.S. PATENT DOCUMENTS

| | | | | |
|---|---|---|---|---|
| 4,579,380 | A * | 4/1986 | Zaremsky | B25J 13/082 294/119.1 |
| 5,002,173 | A * | 3/1991 | Hucul | B25J 19/063 192/150 |
| 5,947,539 | A * | 9/1999 | Long | B25J 15/0028 294/119.1 |
| 6,129,476 | A * | 10/2000 | Berman | B25J 19/063 403/220 |
| 6,847,181 | B2 * | 1/2005 | Brooks | B23Q 17/003 318/568.11 |
| 6,938,938 | B2 * | 9/2005 | Risle | B25J 15/0253 294/119.1 |

(Continued)

FOREIGN PATENT DOCUMENTS

| | | |
|---|---|---|
| DE | 10 2006 045 783 B4 | 4/2008 |
| DE | 10 2013 020 490 A1 | 6/2015 |

(Continued)

*Primary Examiner* — Dean J Kramer
(74) *Attorney, Agent, or Firm* — Klaus J. Bach

(57) ABSTRACT

In a gripping device including carriages disposed on a base body so as to be movable relative to each other by a motor drive, the carriages being provided with gripping elements which are movable with the carriages between an opening and a closing position of the gripping elements, at least one of the gripping elements is supported on the respective carriage so as to be able to yield to a certain engagement pressure force which is adjustable in the range of 5 to 300 N in order to prevent excessive damage or injuries-causing engagement forces.

5 Claims, 5 Drawing Sheets

(56) References Cited

U.S. PATENT DOCUMENTS

| | | | | |
|---|---|---|---|---|
| 7,959,399 B2* | 6/2011 | Horning | ............... | B25J 15/0616 |
| | | | | 414/729 |
| 8,925,986 B2* | 1/2015 | Maffeis | ............... | B25J 15/0253 |
| | | | | 294/119.1 |
| 8,991,886 B2* | 3/2015 | Schuster | .................. | B25J 15/02 |
| | | | | 294/119.1 |
| 8,991,888 B2* | 3/2015 | Schlaich | .................. | B25J 15/10 |
| | | | | 294/213 |

FOREIGN PATENT DOCUMENTS

GB           2119894 A  * 11/1983
WO    2006/117025 A1   11/2006

* cited by examiner

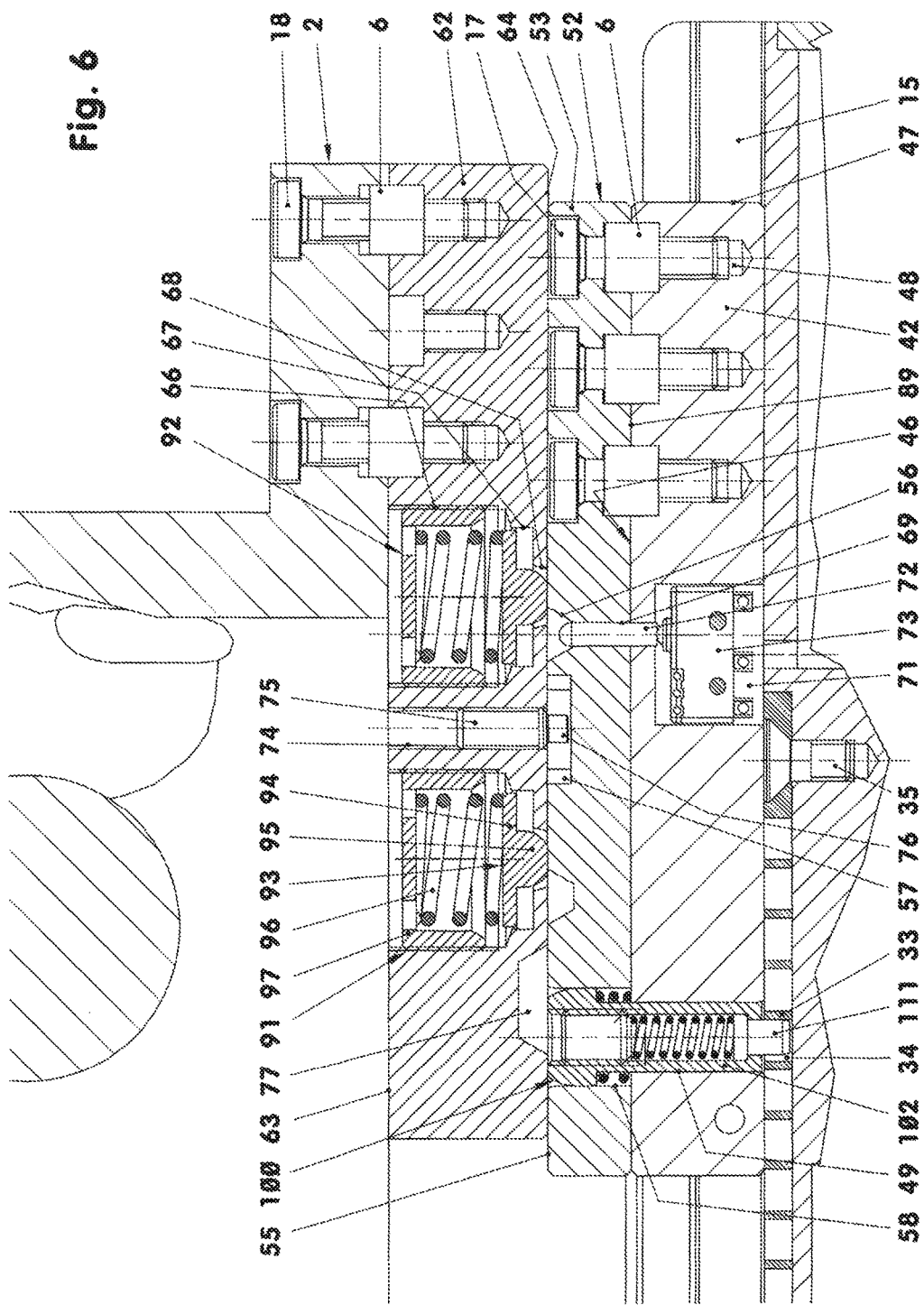

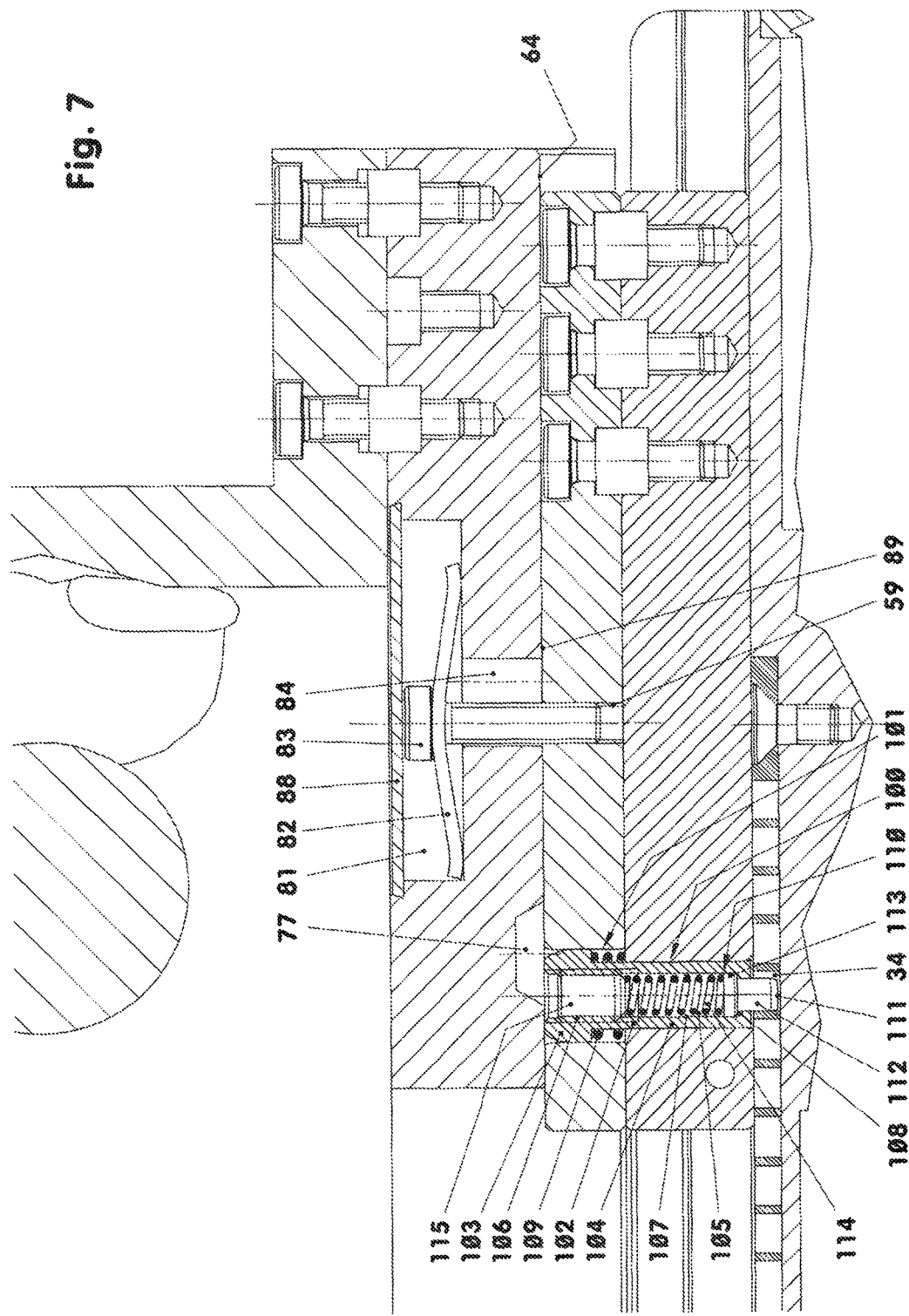

GRIPPING DEVICE WITH LOCKING ARRANGEMENT

This is a Continuation-In-Part application of pending international patent application PCT/DE2016/000250 which was filed 2016 Jun. 14 claiming the priority of German patent application DE 10 2015 007 436.9 filed 2016 Jun. 15.

BACKGROUND OF THE INVENTION

The invention resides in a gripping device with movable carriages provided with gripping elements, wherein the carriages are supported and guided in partially open guide grooves or guide bores arranged in a base body and are movable by a drive arrangement between an open and a closed position.

For a human-robot collaboration, among others a security mechanism for grippers is required which is independent of the machine or apparatus control arrangement. Such a mechanism is intended to ensure in a simple manner, that a machine operator is not subjected to injuries such as finger clamping or bone breakage caused by the gripper.

DE 10 1006 045 783 B4 discloses such a parallel gripping arrangement, wherein the gripping elements are mounted directly on the carriage which is supported on a base body.

It is the object of the present invention to provide a gripping device whose clamping force can be limited to an adjustable value independently of the gripper drive and which, upon being subjected to an overload of the gripping device, should be easily re-settable to the previous normal operating state.

SUMMARY OF THE INVENTION

In a gripping device including carriages with gripping elements disposed on a base body so as to be movable relative to each other by a motor drive between an opening and a closing position of the gripping elements, at least one of the gripping elements is supported on the respective carriage so as to be able to yield to a certain engagement pressure force which is adjustable in the range of 5 to 300 N in order to prevent excessive damage- or injuries-causing engagement forces.

In this way, a gripping device is provided which, for the engagement of a workpiece, has an engagement force which can be limited to a predetermined value. As a result, the machine operator cannot be severely injured if for example his hand is caught between the workplace and the gripper element. Should for example a finger of the operator be caught between the gripping elements and a workplace, the gripping elements are uncoupled from the drive by a locking device which his arranged in the gripper element support and which transfers only an adjustable force. The locking device may be a ratcheting device, a force- or form-looking engagement structure or a force-locking friction or magnetic engagement structure. The looking device can be unlocked upon being subject to an adjustable force in the area of 5 to 300 N.

In that arrangement, each or just one of the gripping elements may be provided with such a coupling mechanism.

The gripping device may also be provided with a drive unit for blocking the movable gripping element support, for example, a carriage per gripping element. The drive unit which may be a wedge drive in the form of a pressure piece cooperates for example with a locking bar which prevents further movement of the gripping element support with respect to the base body as soon as the locking bar extends into a respective recess in the base body which acts as a locking structure.

Depending on the engagement needs, guide tracks may be used which are supportive or which have a wear-resistant or low-friction surface. Depending on the material selection, these properties may also be combined.

The guide tracks used for guiding and supporting the carriages may have any cross-section. Instead of the T-shaped cross-section shown in the exemplary embodiment, rectangular, round, oval and saw-tooth-like cross-sections are possible. The carriages are biased in a direction transverse to the gripping direction or all-around. They may also be supported one after another in only one guide track, -groove, or -bore.

The carriages are driven for example by three drives which are arranged one after the other, for example, via a spar gear drive, a worm gear drive and a rack-and-pinion drive. Instead of these types of, or additionally, wedge drives, curved lever, detent or pull rope driven may be used.

In the exemplary embodiments, only parts of parallel gripping devices are shown. Of course, most parts, with the exception of the housing, may be used also for three-, four-, and multi-jaw, multi-carriages or centric gripping devices can be used so that the solution shown can also be used with these devices. In connection with three-, four or multi-multi-jaw gripping devices in the for example star-like (or parallel guide grooves generally two carriage guide tracks are provided, which consist of a more load resistant material than the base body. But in each guide groove also only one, three or several individual carriage guide tracks may be installed.

The arrangement can be used in connection with external as well as with internal gripping devices.

The invention will become more readily apparent from the following description of exemplary embodiments thereof with reference to the accompanying drawings.

BRIEF DESCRIPTION OF THE DRAWINGS

It is shown in:

FIG. 6: The same as FIG. 5 but with the gripping element being released from, the carriage: (as a result of the finger squeezing), FIG. 7: The same as FIG. 6 but here, the carriage is being locked in the base body, finger squeezing is releasable.

DESCRIPTION OF EXEMPLARY EMBODIMENTS

Figure 1:
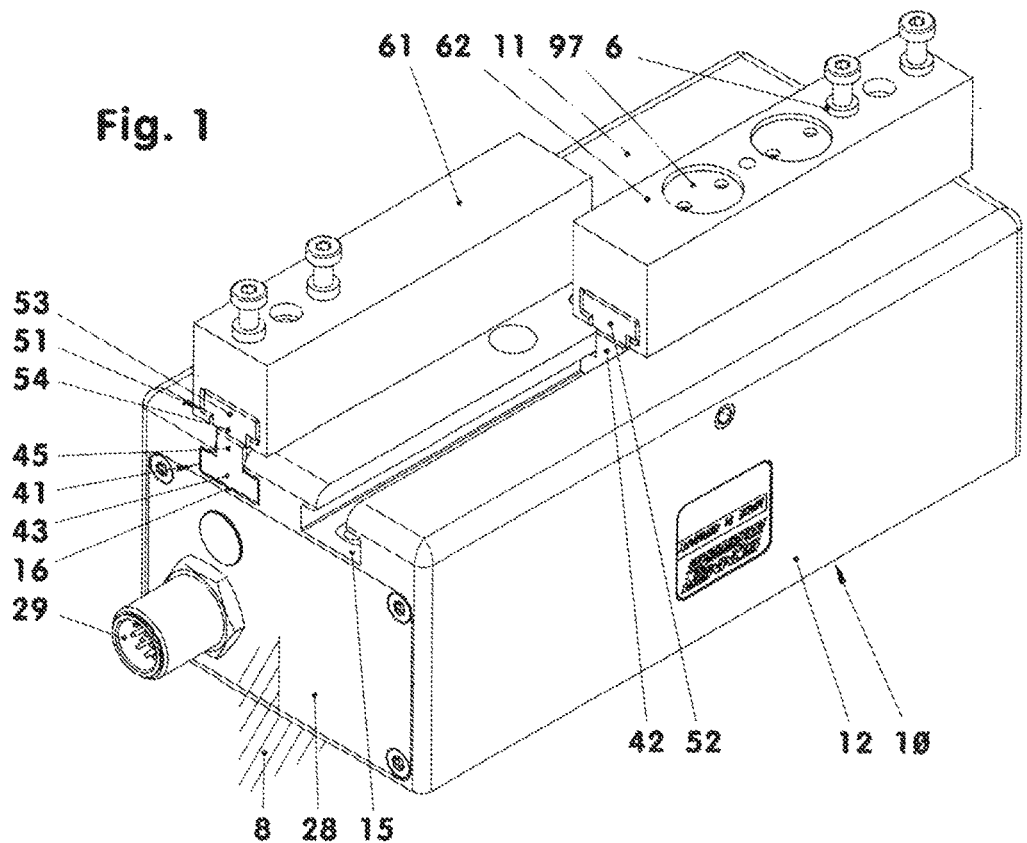
FIG. 1: A perspective view of a parallel gripping device.
Figure 2:
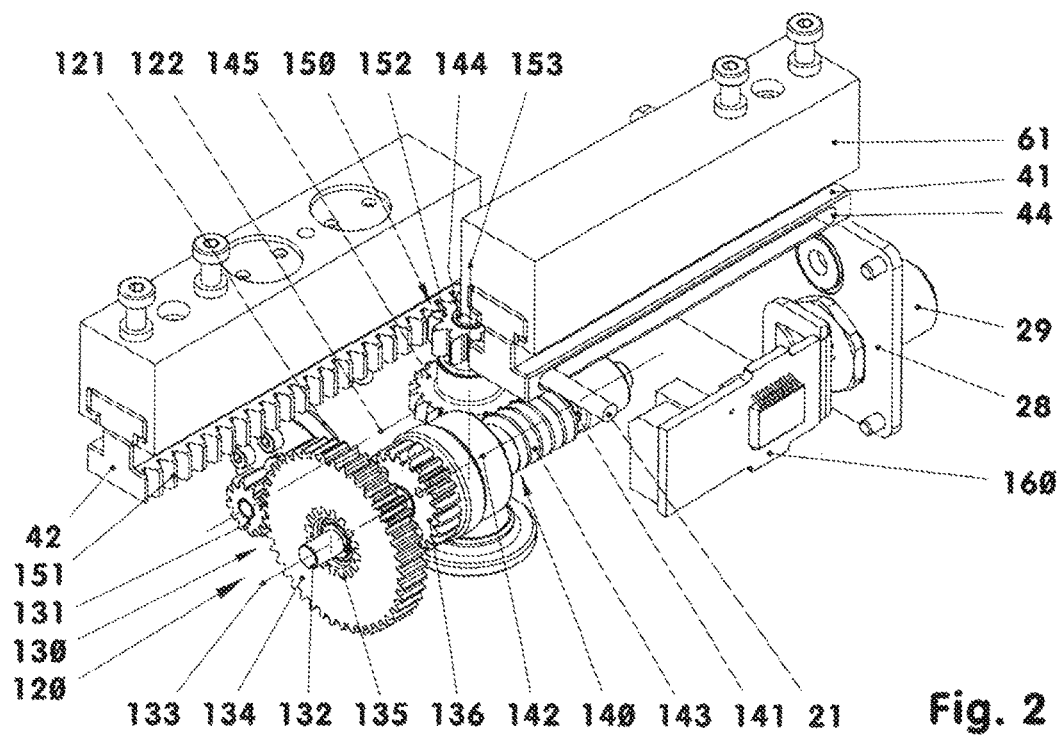
FIG. 2: A perspective view of a parallel gripping device tuned by 180°, without housing.

FIGS. 1 and 2 show an electric motor-driven parallel gripping device with two carriages 41, 42' provided with gripping elements 1, 2 which are not shown in these figures. The carriages 41, 42 and the drive 120, that is, the motor 12, the gearing 130, 140, 150 and the control 160 are supported in a base body a housing 10.

The base body 10 is a parallelepiped body manufactured for example of an aluminum alloy. The dimensions of the base body 10 are in the exemplary embodiment 120×62×

45.2 millimeters. The base body 10 has at its top side two T-shaped guide grooves 15, 16. These guide grooves 15, 16 extend parallel to the body edge of the housing 10. Their distance from guide groove center to guide groove center is for example 22 mm. The guide surfaces of the guide groove 15, 16 are hard-coated, that is, the housing 10 is at least in the areas of the guide grooves 15, 16 for example galvanically coated by a ceramic-like aluminum oxide layer.

In the guide grooves 15, 16 of the housing 10 two carriages 41, 42 are guided. Both carriages comprises a lower drive section 43 and an upper carriage web 45. The wider lower drive section 43 is provided at each side with a gear rack profile 151. At its opposite, the gear rack profile 151 the drive section 43 has an abutment groove 44 which ends shortly ahead of the end of the carriage and forms a stop. A stop pin 21 extending into the respective abutment groove 46 is mounted in the housing 10.

The carriage web 45 extends in both carriages 41, 42 over the housing top side 11 by for example 0.4 mm. At its top side 46,—see FIG. 3—each carriage 51, 52 carries for example at the ends facing the respective outer front sides 47 three centering sleeves 6 and three mounting bores 48. The mounting bores 46 have below the cylindrical recesses in each case an internally threaded area. Onto the centering sleeves 6 on each carriage 41, 42, a safety carriage guide track 51, 52 is disposed and is attached in each case via three screws 17 screwed into the respective mounting bores 48.

The individual safety carriage guide track 51, 52 has for example a length corresponding to the length of the supporting carriage 41, 42.

For example, in a cross-section T-shaped safety carriage guide track 51, 52 comprises a parallel flange 53 and a web 54. The latter has for example a width corresponding to the width of the carriage web 45.

On the parallel flange 53 of the at least one safety carriage guide track 51, 52, a safety carriage 61, 62 is supported and guided. The safety carriage 61, 62 extends completely around the parallel flange 53 on its top and its sides with little play. As its bottom side, the parallel flange 53 abuts for example to such an extent that it just does not contact the web 54. At each outer end, each safety carriage guide track 51, 52 has three internally threaded dead end bores of which at least one is used for mounting a gripping element 1, 2. The centering and mounting is performed in the same way so which also the safety carriage guide track 51, 52 is mounted onto the respective carriage 41, 42.

At the front sides of the single-piece housing 10, there is a relatively large recess which can foe closed by a separate lid 28. The two lids 28 of for example the same size are mounted to the housing by four countersink screws so as to be flash with the housing contour—see FIG. 1. The as shown in FIG. 1 front cover 28 is provided with a multi-pole connecting socket 29.

In the base body or housing 10, a motor 121 with a signal generator is mounted below the guide grooves 15, 16. As shown in FIG. 2 acts on a worm gear drive 140 via a two-stage gear arrangement 130 whose spur gears are provided with for example straight teeth. On the worm gearing shaft 144 of the worm gear drive 140, a synchronous gear 152 with for example straight teeth is arranged which is in engagement with the gear rack 151 of the carriage 41, 42.

The signal generator for provides a signal for a position control of the gripping arrangement.

In detail, on the drive shaft of the electric motor 121, a pinion 131 with for example 12 teeth is arranged. The center line 12 of the motor 12 is oriented so as to extend parallel to the guide grooves 51, 52. The pinion 131 is in engagement with a first counter-shaft gear 134 with for example 42 teeth which is arranged on a countershaft 132. The counter shaft 132 is supported on the base body 10 by friction- or anti-friction bearings. The bearing arrangement of the countershaft 132 is not shown in the Fig.

The smaller, second counter shaft gear 135 is in engagement with a 24-teeth gear 136 which is arranged on the worm gear shaft 141 of the worm gear drive 140. On the worm gear shaft 141 also in the worm gear 143 is arranged which is in engagement with the worm gear which is disposed on the worm gear output shaft 144.

The for example single-thread cylindrical worm gear 143 is engagement with the for example 20 tooth worm gear wheel 145. The two have axes which extend in directions normal to one another. In the exemplary embodiment, the worm gear wheel 145 is provided with a helical gearing whose angle of inclination corresponds to the pitch angle of the cylindrical worm gear 143. Because of the helical gearing the worm gear wheel 145 is called a non-genuine worm gear wheel. The tooth flanks of the gear pairs have in contrast to regular worm gear sets only a point contact. The resulting longitudinal slide movement of the tooth flanks requires therefore wear-resistant materials or tempered gears. In the exemplary embodiment, the worm 143 and the worm gear wheel 145 are each manufactured from a nitrated steel 334CrAlNi 1-10 and accordingly surface-tempered.

With the non-genuine worm gear wheel 145, the center line of the worm gear 143 does not need to be installed in the housing 10 with its axis extending through the center piano of the worm gear arrangement. The height may be spaced from the center line 142 by a space in the millimeter range.

At both ends of the cylindrical worm gear, the bearings of the worm gear shaft 141 are shown.

The synchronous shaft 144 arranged vertically in the housing 10 is provided above the worm gear wheel 145 with a 10 teeth synchronous gear 152 which, in the exemplary embodiment is in engagement with the two gear rack profiles 151 of the carriages 41, 42.

In FIG. 2, in the right housing area, a control beard 160 provided with electronic devices via which the power supply to the motor 121 is controlled and by which position sensor data and other sensor values are collected and further processed. Some components of the circuit board are electrically connected to a connection socket 29.

Figure 3:
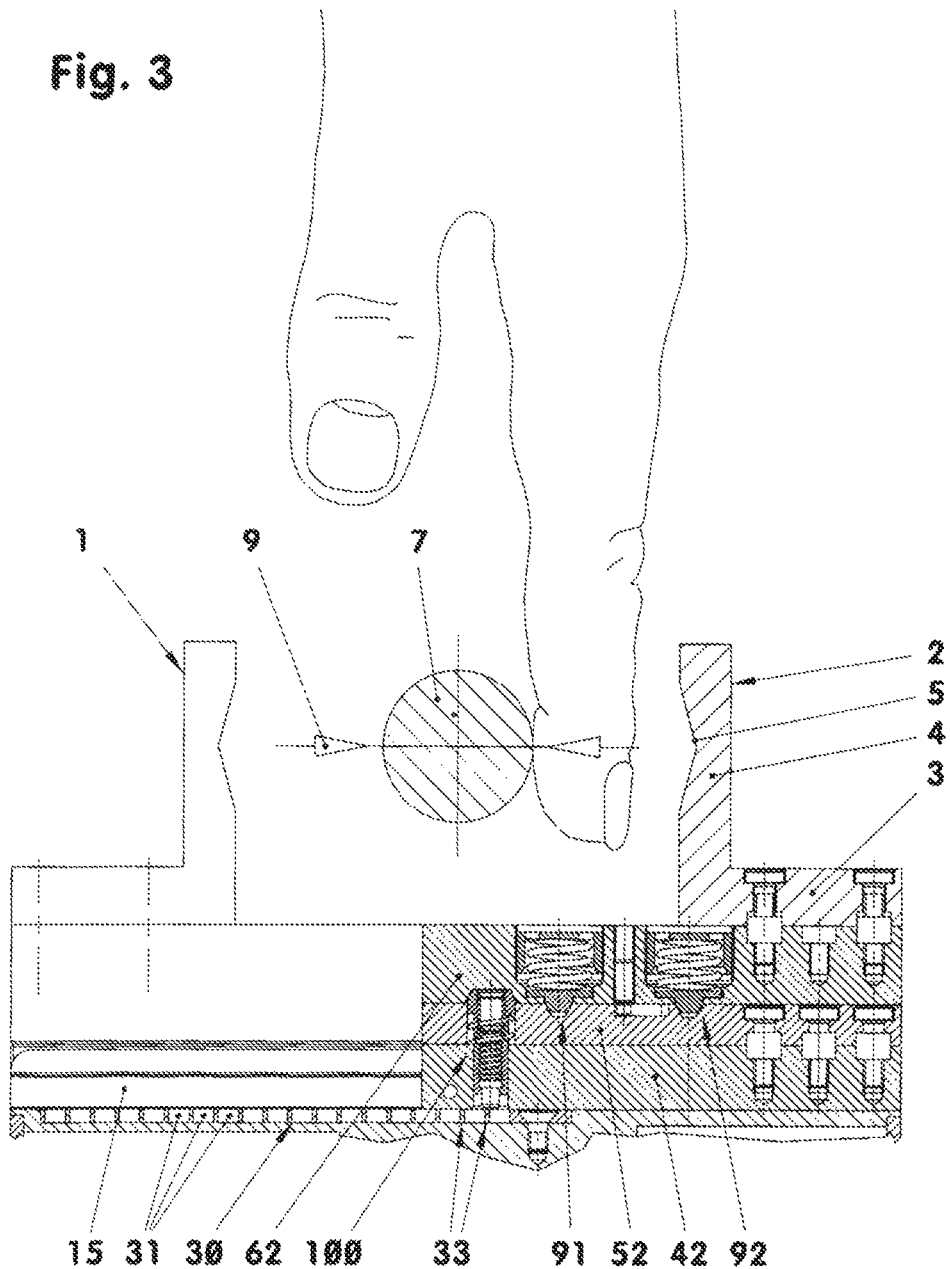
FIG. 3: A side view, partially in section, of the gripping device in an open position.

FIG. 3 shows a parallel gripping device with two gripping elements 1, 2 disposed each on a carriage 41, 42. The carriages 41, 42 which are movable in the longitudinal direction (see FIG. 1) are slideably guided in the housing or, respectively, the base body 10, each in a guide groove 15, 16. The parallel gripping devices are mounted by way of the base body 10 on a machine- or, respectively, operating device part. Some parts of the gripping device are adjustable for obtaining a highly accurate carriage guidance or assembled from parts which are preselected according to tolerances.

FIG. 3 is a side screw of the upper part of a parallel gripping device. The gripping device is shown in a partial longitudinal cross-section which is at the level of the front gripping element 2 which is screwed onto the carriage 62. The cross-sectional area extends here primarily through the area between the carriage 42 and the gripping element 2. The carriages 41, 42 are arranged in their outer positions so that the mounted gripping elements 1, 2 are in their maximum open positions at the largest distance from each other. Between the gripping elements 1, 2, for example, a cylindrical workpiece 7 is shown. It is shown in a transfer position from an apparatus which is not shown for being taken over by the gripping device. Between the gripping element 2 and the workpiece 7 the index finger of a human hand is shown to indicate symbolically the danger of a finger clamping.

For an explanation safety-relevant components of the gripping element, among others the enlarged representation of FIG. 6 is used.

The carriage 42 is guided in the guide groove 15. Onto the carriage 42, the safety carriage guide track 52 is screwed. On the safety carriage guide track, the safety carriages 61, 62 which carry the gripping elements 1, 3 are guided. The for example angled gripping elements 1, 2 (see FIG. 3) consist each of an element base 3 and an element arm 4. The element base 3 is disposed centrally on, and screwed to, the safety carriage 62. The element arm 4 extending vertically upwardly therefrom is used for gripping the workpiece 7. The element arm 4 is provided with a recess 5 so as to be capable of partly engaging the workpiece in a form-looking manner.

In order to protect a machine operating in connection with human-robot-collaboration from possible injuries by the closing of the gripping elements 1, 2 of the gripping device, the gripping elements should not be able to exceed a predetermined closing force which is in the area of 5 to 300 N. In the exemplary embodiment, the closing force limit is adjusted to 135 N.

A mechanical engagement lock 90 prevents—without involvement of the gripping element control—that the closing force is exceeded by initiating a certain deflection of at least one gripping element 1, 2 in toe slide groove 89 toward the support carriage 41, 42. The slide groove 89 comprises in she exemplary embodiment all contact surfaces which are present between the respective safety carriage 41,42 and the supporting safety carriage guide track 51, 52. This includes the surfaces which extend parallel to the vertical longitudinal center plane 8.

The engagement lock 90 is a locking structure with a form and force-locking arrangement which includes two locking directions and a limited retaining force. The locking force is generated by a corresponding engagement shape and external force. If for generating the external force for example a mechanical spring element is used the spring force may be adjustable. Generally, the locking arrangement comprises a blocking piece, a blocking actuator, a web and possibly a release member, see VD1/VDE 2053 sheet 1, 1967.

For a predetermined deflection of at least one gripping element 2, in accordance with the exemplary embodiment for example only three pressure pieces 91, 92, 100 are arranged between the safety carriage guide track 52 and the safety carriage 62—each for example extending normal to a plane of the slide groove 89. The pressure pieces 91, 92 are of the same shape. They comprise of a locking member 93 at least one spring element 96 and an adjustment element 97. The respective pressure piece 91, 92 is disposed in the safety carriage 61, 62 above the pressure piece 91, 92 so as to be for example height-adjustable.

The locking member is a disc 94 on the underside of which centrally an almost complete hemisphere 95 is provided. The disc 94 and the hemisphere 95 have the same center line. The adjustment element 97 has the form of a pot provided with an external tread. Into the essentially cylindrical hollow space of the pot, in which for example at least one compression spring 96 is accommodated, extend two engagement bores which are oriented eccentrically and parallel to the centerline of the pot. Via the engagement bores, the adjustment element can be screwed into the safety carriage 61, 62 to different depths.

In the safety carriage 62, there is the adjustment element 97, the locking member 93 and the respective spring element 96 in a stepped bore 66 whose largest area is provided with a fine thread for accommodating the adjustment element 97. Between the planar bottom of the stepped bore 66 and the area provided with the fine thread there is a short guide area 67 whose diameter exceeds for example by 0.1 mm the maximum diameter of the locking member 93 which is axially guided in this area.

In the bottom of the stepped bore 66, there is a central opening 68 through which the hemisphere can be moved with some play. The center line of the hemisphere 95 extends coaxially with the centerline of the fine thread. The opening 68 has here for example a straight conical truncated cone-sleeve-like wall. The pointed angle of the truncated cone sleeve shape is for example 30 annular degrees. The tip of the truncated cone angle is in FIG. 6 below the stepped bore 66 in the area of the carriage 42.

As shown in FIG. 6, the hemisphere 95 has a flattened end via which it abuts the top side 55 of the safety carriage guide track 52 when it is pressed by the spring 96 into the spring 68.

Figure 4:
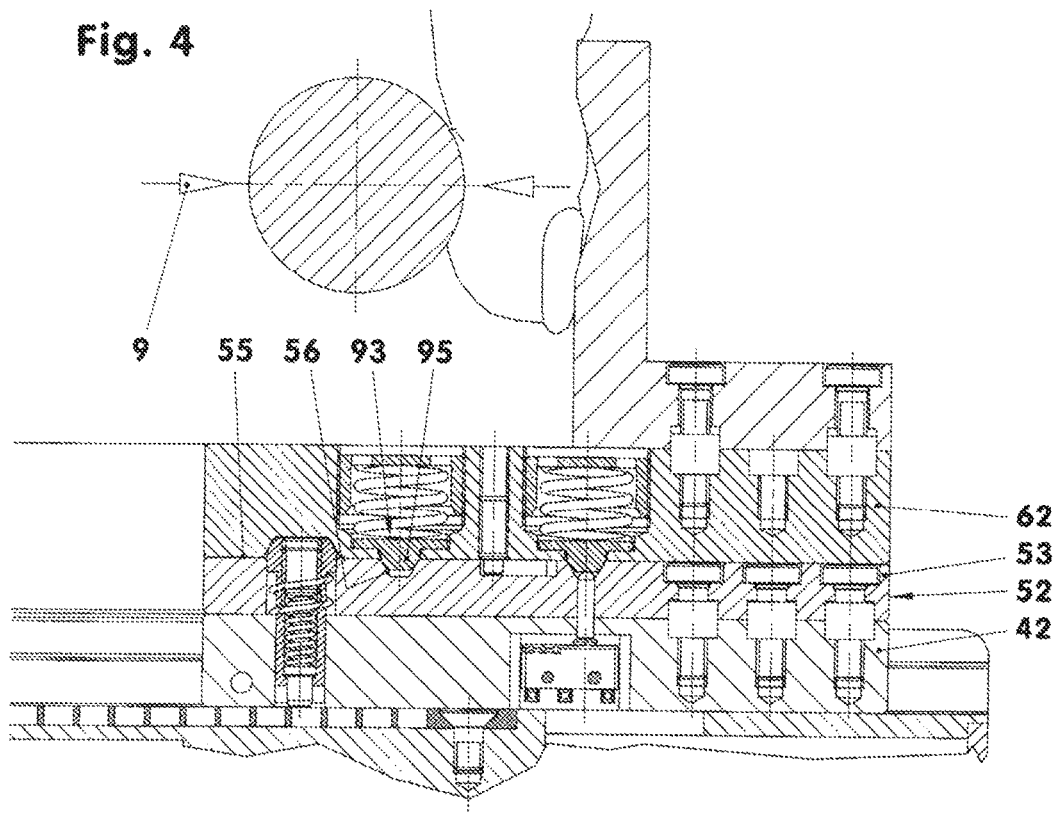
FIG. 4: The same as FIG. 3, but with the carriage moving into a closed position in contact with a finger.

As shown in FIG. 4, where no displacement has yet occurred between the safety carriage guide track 52 and the safety carriage 62 concerning the gripping direction 9, the hemisphere 95 of the locking member 93 projects into a conical recess 56 at the upper side 55 of the safety carriage guide track 52. The conical recess 56 has a wall in the form, of a straight cone-shaped shell whose cone angle is for example 60 angular degrees. The imaginary tip of the cone lays in the area of the web of the safety carriage guide track 52.

The opening diameter of the recess 56 and the diameter of the hemisphere 95 are accurately adapted to each other so that the hemisphere 95 is in contact with the wall of the recess 56 for example 0.5 mm below the top side 55 of the parallel flange 53. In FIGS. 3 and 4, the bottom side of the disc 94 of the locking member 93 is not disposed on the bottom of the stepped bore 66. The distance between the disc 94 and the bottom is for example 0.05 to 0.2 mm.

When now the safety carriage 62 is displaced with respect to the safety carriage guide track 52 in the gripping direction 9, the locking force is somewhat increased because of the spring element stroke and the spring rate of the spring element or elements 96, 109 up to a safety carriage displacement length of 0.53 mm but then rapidly decreases again because of the curvature of the hemisphere 95. The value of 0.53 mm is a function of the geometric data of the hemisphere 95, the recess 56 and the original insert depth with which the hemisphere 95 is engaged in the recess 56. By a change of these data and the number of pressure pieces 91, 92, 100 of each safety carriage 61, 62, the maximum clamping force can be adjusted or predetermined.

In accordance with the definition of a locking arrangement, the locking member 93 extends into the recess 56 of the safety carriage guide tracks 52. The latter forms the blocking structure in this case. The function of the web is assumed in the exemplary embodiment by the pot-shaped adjustment element 97 screwed into the safety carriage. Instead of the direction-independent engagement lock, in the present arrangement also a toothed directional locking structure could be used. With a directional tooth locking structure, a locking release only in one direction is possible. This direction is oriented opposite to the respective gripping direction.

Figure 5:
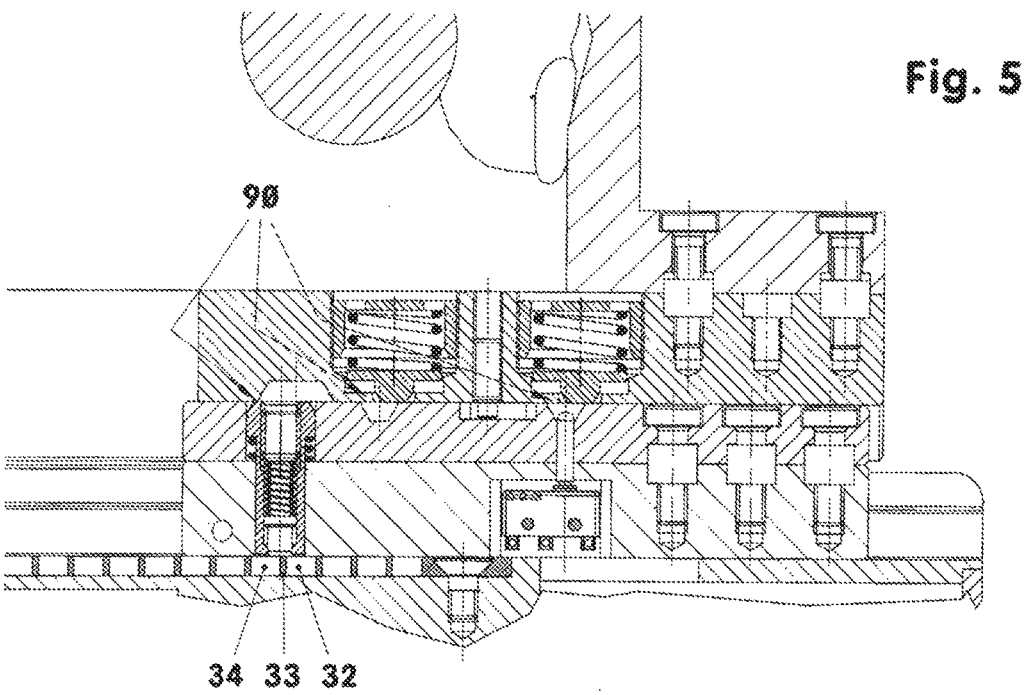
FIG. 5: The same as FIG. 1 with gripping elements being disconnected from the carriage, with slight finger squeezing.

In FIGS. 4, 5, and 6 in each case, the right conical recesses 56 of the parallel flange 53 have, at their bottoms or the lower area of the recess 56, a bore 69 extending through the safety carriage guide track 52, into which bore 69 a lifting pin 72 is inserted. The bore 69 extends into a switch cavity 71 which, as shown in FIGS. 4, 5 and 6 is machined from the bottom into the carriage 42. In the switch cavity 71, there is for example a microswitch 73 disposed with a switching cam on which the lifting pin 72 is supported.

As soon as the locking member 93 leaves the conical cavity 56, the switching cam, which up to then was held down against a micro-switch spring, is unloaded so that the microswitch 73 initiates for example an electrical signal. The signal is interpreted by the gripping device control as a release of the respective safely carriage 42.

With a return of the safety carriage 42 to its original position, the locking member 93 again presses the lifting pin 72 downward so that the microswitch 73 is changed to another switching position. It may for example switching the signal off. In place of the microswitch 73, capacitive, inductive or magnetic switches or similar may be used.

In the exemplary embodiment, two pressure pieces 91, 92 of the same design are arranged side-by-side in the safety carriage 62. Their parallel center lines which are arranged also in the vertical longitudinal center plane of the safety carriage 62 may also be tilted for example by 90 angular degrees so that they are oriented parallel to a normal of the large sidewalls 12 of the base body 10. Herein, also the actuating directions of the pressure pieces 91, 92, 100 may be opposite to one another.

Between the pressure pieces 91, 92, in the safety carriage 62 there is a threaded bore 74 into which a threaded pin 75 with a long peg 76 is threaded. The centerline of the threaded bore 74 is arranged in the plane of the centerlines of the pressure pieces. The peg 76 of the threaded pin 75 extends lute an elongated opening 57 formed in the parallel flange 53. The ends of the elongated opening 57 form stops for the safety carriage movement.

In accordance with FIGS. 3 to 6, in the left end area of the carriage 42 and the safety carriage guide track 52, there is a double pressure piece 100 which is guided, on one hand, in a larger bore 58 of the safety carriage guide track 52 and, at the other hand, in a smaller bore 49 of the carriage 42. Both bores 49, 58 are oriented coaxially with respect to each other. The double pressure piece 100 comprises an outer and an inner pressure piece 110.

The outer pressure piece 101, see FIG. 7, is a hollow bolt 102 with a support head 103 and a shaft 104. The support head 103 is guided in the bore 58 with little play whereas the shaft 104 is guided in the bore 49, also with only little play. The upper half of the support head 103 is in the form of a flattened hemisphere. The diameter of the hemisphere corresponds to the diameter of the support head 103. Between the support head 103 and the top side 46 of the carriage 42, a spring element in the form or a compression spring 109 is arranged which, guided by the shaft 104, biases the double pressure piece 100 toward the bottom side 64 of the safety carriage 62.

The safety carriage 62 includes a conical recess 77 by which the support head 103 is engaged as shown in FIGS. 2 and 4. The contact circle between the support head 103 and the recess 77 is spaced from the bottom side 64 of the safety carriage truck 62 by for example 1.5 mm. The cone angle of this recess 77 is also for example 60 angular degrees. The operation of the outer pressure piece 101 corresponds to the operation of the already described larger pressure piece 91, 92. In principle, only one pressure piece 91, 92, 100 is sufficient for the force-limited blocking of the safety carriage 62 on the carriage 42, if the respective spring element 96, 109, 114 or a combination of the same or different spring elements can generate the required blocking force.

As shown in FIG. 3, in the area of the groove bottom of the guide groove 15, a blocking web strip 30 is provided as a locking member. This is for example a flat rod, which includes along its length a plurality of equidistantly arranged engagement bores 31. The center line of all engagement bores 31 is disposed in one plane. This plane is oriented parallel to the vertical longitudinal center plane 8. The blocking web strip 30 is rigidly connected to the base body by a flat-head screw 35. Between the bores 31 are the transverse webs 33.

The blocking web strip 30 cooperates with a blocking pin 111 of the inner pressure piece 110. The inner pressure piece 110, see FIGS. 6 and 7, is arranged in the hollow space 105 of the outer pressure piece 101. The hollow space 105 has as wall a stepped bore, which is divided into three areas that is, from the top, a threaded area 106, a guide area 107 and a retaining area 108.

In the lower part of the guide area 107, the blocking pin 111 is arranged with some play. The blocking pin 111 is in the form of a bolt 112, which is provided at its upper end with a stop collar 113. By way of the stop collar 113, the blocking pin 111 is supported on the inner annular front surface of the retaining area 108. The shaft of one bolt 112 extends through the retaining area into a bore 34 of the blocking web strip 30, see FIGS. 6 and 7. It extends into the bore 34 to an extent of for example 50 to 95% of its length.

Into the threaded area 106 of the hollow space 105, a threaded pin 115 is screwed. Between the threaded pin 115 and the blocking pin 111, a spring element in the form of a compressed coil compression spring 114 is arranged. The spring element 114 is supported for example sidewardly on the wall of the guide area 107.

Instead of the blocking web strip 30 as shown, any multi-compartment blocking member may be used which, instead of bores, has other cavities or recesses, projecting pins, teeth, cams or comparable projections as long as the respective recesses or projections can cooperate with a blocking element.

The inner pressure piece 110 represents together with the stationary blocking web strip 30, a bolt locking structure. It does not have an adjustable holding force since its blocking member, that is, the blocking pin 111 extends in a form-fitting manner into the blocking piece, that is, the blocking web strip 30 for firm engagement therein. In the present case, the outer pressure member 101 serves as web and, at the same time, via the spring element 109, as lifting element.

The double pressure piece 100 has two functions. On one hand, it provides the common engagement function of the simple pressure piece which permits a relative movement between the carriage 41, 42 and the safety carriage 61, 62 during a clamping force excess. On the other hand, it is to block or switch off she gripping device drive 120 which moves the carriages 41, 42.

The second function will be explained on the basis of FIGS. 3 to 7. FIG. 3 shows the carriages 41, 42 of the gripping elements at the start of a gripping element closing movement. The double pressure piece 100 is locked in the recess 77. With the outer pressure piece 101, the blocking pin 111 of the inner pressure piece 110 is retracted to such an extent that, in accordance with FIGS. 3 and 4, the blocking pin 111 is not in contact with the blocking web strip 30. The blocking pin 111 is for example spaced from the blocking web strip 30 by at least 0.2 mm.

As shown in FIG. 4, the gripping element 2 comes into contact with the finger of an operator. The finger clamping force has not yet reached the allowed maximum value.

As shown in FIG. 5, the maximum finger clamping value has been exceeded. The pressure pieces 91, 92 are dislodged from the recesses 56. By the upward movement of the outer pressure piece 101, the lower front side of the hollow bolt 102 is disposed in front of the blocking web strip 30 by a few tenths of a millimeter. The locking pin 111 is disposed under tension of the spring element 114 for example, between two bores 32, 34 on a transverse web 33 of the blocking web drip 30. In this position, there is no blocking effect of the inner pressure piece 110 available. The gripping element drive 120 moves the carriages 41, 42 further in the gripper element closing direction 9. However, the moving safety carriage 62 yields by at least the amount by which the carriage 42 which supports the safety carriage moves on.

As shown in FIG. 6, the carriage 41, 42 has moved by about half the distance between the bores 31 of the blocking web strip 30 to the point where the blocking pin 111 that is its bolt 112 has been moved by the coil compression spring 114 into the bore 34.

From here on, the carriage 41, 42 proceeds only until the left side of the bolt 112 abuts the left side wall of the bore 34, see FIG. 7. Now, the carriage 42 is blocked with respect to the housing 10. The gripping element drive 120 is switched off for example by the motor current increase resulting from the blocking.

Since the possible stroke of the peg 76 in the elongated hole 57 is always larger than the distance between two adjacent bores 31 of the blocking web strip 30, the finger clamping force cannot exceed its original value which occurs with the transition of the carriage position from that shown in FIG. 4 to the one shown in FIG. 5.

At the latest upon switching off the motor 121, the finger clamping gripping element 2 can be pushed back. The force needed herefor is only a fraction of the finger clamping force. It is for example in the range of 1 to 20 N. As soon as the finger is released, the respective gripping element 1, 2 can be moved together with its safety carriage 61, 62 back to its original position. The original position is reached when the looking member 93, 103 of the pressure piece or pieces 91, 92, 100 engage into the respective conical recesses 56, 77.

In FIG. 7, the safety carriage 62 is locked to the carriage 42 mainly by frictional engagement. To this end, the safety carriage 62 is provided with for example an essentially rectangular recess 81 in which as spring element for example a leaf spring 82 is arranged. The leaf spring 82 is for example a two-arm rectangular leaf spring element with curved ends. In the center, it has a through-bore via which the spring element is tensioned by a bolt 83 toward she bottom wall of the recess 81. The bolt 83 is threaded into a threaded bore 59 of the safety carriage guide track 52.

The spring element may also be a multi-layered leaf spring. For a reduction of a spring weakening by the central bore, the leaf spring may also be a two-armed trapezoidal spring. In addition, the bolt 83 or a group of bolts can hold down the spring elements without mounting bores for example by means of a bracket mount. Instead of a leaf spring, also other types of springs may be used.

In the exemplary embodiment, the bolt 83 and the elongated hole 84 have the same stop function which in FIGS. 3 to 6 is provided by the peg 76 and the elongated opening 57.

If a blocking of the carriage 42 on the base body 10 is to be provided for, the double pressure piece 100 is also installed in this case. Herewith the needed release force of the outer pressure piece 101 is substantially smaller than the frictional engagement force effective between the safety carriage 62 and the safety carriage guide track 52.

In order to increase the frictional engagement force between the carriage 62 and the track 52, the bottom, side 64 of the carriage 62 and/or the upper side 55 of the track 52 may be roughened by a surface treatment to such an extent that the normal friction coefficient of the particular metal pairing in the slide groove 89 is increased. Such roughening can be achieved for example by sandblasting etching or similar procedures. Also the cutting of a rough structure is possible. Furthermore, friction layers may be inserted into part or all of the slide groove 89.

When, in the preceding description, a "small play" is mentioned, in connection with the present order of size of the gripping device, the play is normally 0.005 to 0.3 mm.

Listing of Reference Numerals:

| | |
|---|---|
| 1, 2 | Gripping elements |
| 3 | Element base |
| 4 | Element arm |
| 5 | Recess |
| 6 | Centering sleeve |
| 7 | Workpiece |
| 8 | Vertical center plane |
| 9 | Gripping direction |
| 10 | Housing, base body |
| 11 | Housing topside |
| 12 | Side walls |
| 15, 16 | Guide grooves |
| 17 | Bolt |
| 18 | Bolts |
| 21 | Stop pin |
| 28 | Lid |
| 29 | Connection socket |
| 30 | Blocking web strip |
| 31 | Engagement bores |
| 32 | Engagement bore |
| 33 | Transverse webs |
| 34 | Engagement bore |
| 35 | Flat head screw |
| 41, 42 | Carriages |
| 43 | Drive section |
| 44 | Abutment groove |
| 45 | Carriage web |
| 46 | Top side of carriage |
| 47 | Outer front side |
| 48 | Mounting bore |
| 49 | Bore, small |
| 51, 52 | Safety carriage guide track |
| 53 | Parallel flange |
| 54 | Web |
| 55 | Upper side |
| 56 | Conical recess |
| 57 | Elongated opening |
| 58 | Bore for double pressure piece |
| 59 | Threaded bore |
| 60 | Control |
| 61, 62 | Safety carriage |
| 63 | Top side |
| 64 | Bottom side |
| 66 | Stepped bores |
| 67 | Short guide area |
| 68 | Central opening |
| 69 | Bore |
| 71 | Switch cavity |
| 72 | Lifting pin |
| 73 | Microswitch |
| 74 | Threaded bore |
| 75 | Threaded pin |
| 76 | Peg |
| 77 | Conical recess |
| 81 | Elongated opening |
| 82 | Leaf spring |

-continued

Listing of Reference Numerals:

| | |
|---|---|
| 83 | Bolt |
| 84 | Elongated opening |
| 88 | Clamping lid |
| 89 | Slide groove |
| 90 | Engagement lock |
| 91, 92 | Pressure pieces |
| 93 | Locking member |
| 94 | Disc |
| 95 | Hemisphere |
| 96 | Spring element |
| 97 | Adjustment element |
| 100 | Double pressure piece |
| 101 | Outer pressure piece |
| 102 | Hollow bolt |
| 103 | Support head |
| 104 | Shaft |
| 105 | Hollow space |
| 106 | Threaded area |
| 107 | Guide area |
| 108 | Retaining area |
| 109 | Spring element |
| 110 | Inner pressure piece |
| 111 | Blocking pin |
| 112 | Bolt |
| 113 | Stop collar |
| 114 | Coil compression spring |
| 115 | Threaded pin |
| 120 | Drive |
| 121 | Motor |
| 122 | Center line |
| 130 | Gearing |
| 131 | Pinion |
| 132 | Counter shaft |
| 133 | Center line |
| 134 | 1. Countershaf gear |
| 135 | 2. Countershaft gear |
| 136 | Drive gear |
| 140 | Gearing |
| 141 | Worm gear shaft |
| 142 | Center line, axis |
| 143 | Cyl. Worm gear |
| 144 | Synchronous gear shaft |
| 145 | Worm gear wheel |
| 150 | Gear rack drive |
| 151 | Gear rack profile |
| 152 | Synchronous gear |
| 153 | Center line |
| 160 | Control, control unit |

What is claimed is:

1. A gripping device with movable carriages (41, 42) comprising: a base body (10) with at least partially open guide grooves (15, 16) in which the carriages (41, 42) are supported so as to be movable on the base body (10), the carriages being provided with gripping elements (1, 2) and connected to drives for moving the carriages between an open and a closed position of the gripping elements (1, 2) wherein the gripping element of at least one of the carriages (41, 42) is supported on the respective carriage via an adjustable engagement structure locking the gripping element in position on the carriage but releasing it to yield when an engagement force exceeds a value adjusted in the range of 5 to 300 N, whereby, when the adjusted engagement force value is exceeded by a relative movement between the gripping elements (1, 2) and the carriage (41, 42) supporting the gripping element, a drive (77, 103) of the respective gripping element is activated so as to block the movement of the carriages (41, 42) on the base body (10), the drive (77, 103) for blocking the carriage (41, 42) on the base body (10) cooperating with a locking structure (30, 110, 111) including a blocking web (30) mounted on the base body (10) and having engagement openings (31, 32, 34) and a locking pin (111) disposed on the carriage (41, 42) for engagement into one of the engagement openings (31, 32, 34).

2. The gripping device according to claim 1, wherein the drive (77, 103) is a slide wedge drive.

3. The gripping device according to claim 1, wherein at least one of the carriages (41, 42) which includes an engagement structure is provided with a safety carriage (61, 62) which is supported on the at least one carriage via a safety carriage guide track (51, 52).

4. The gripping device according to claim 3, wherein part of the drive (77, 103) and part of the locking structure (30, 110, 111) are combined in a double pressure piece (100).

5. The gripping device according to claim 4, wherein the double pressure piece (100) comprises an outer pressure piece (101) and the outer pressure piece (101) is spring supported on the carriage (41, 42) and movable so as to be capable of engaging in a recess (77) of the safety carriage (61, 62) and an inner pressure piece (110) which is movably supported in the outer pressure piece (101) and supports the locking pin (111) so that the locking pin (111) is movable independently of the blocking movement of the locking structure (30, 110, 111).

\* \* \* \* \*